(12) United States Patent
Platt et al.

(10) Patent No.: US 7,016,884 B2
(45) Date of Patent: Mar. 21, 2006

(54) PROBABILITY ESTIMATE FOR K-NEAREST NEIGHBOR

(75) Inventors: John C. Platt, Bellevue, WA (US); Christopher J. C. Burges, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 10/183,213

(22) Filed: Jun. 27, 2002

(65) Prior Publication Data

US 2004/0002931 A1 Jan. 1, 2004

(51) Int. Cl.
*G06N 3/02* (2006.01)
(52) U.S. Cl. .......................................... 706/20; 706/15
(58) Field of Classification Search ................. 706/46, 706/20, 15, 27
See application file for complete search history.

(56) References Cited

U.S. PATENT DOCUMENTS

| | | | | |
|---|---|---|---|---|
| 5,943,661 | A | * | 8/1999 | Katz ............................ 706/16 |
| 6,003,027 | A | | 12/1999 | Prager |
| 6,061,472 | A | | 5/2000 | Hullender et al. |
| 6,192,360 | B1 | | 2/2001 | Dumais et al. |
| 6,233,575 | B1 | | 5/2001 | Agrawal et al. |
| 6,327,581 | B1 | | 12/2001 | Platt |
| 6,347,309 | B1 | | 2/2002 | De Tremiolles et al. |
| 6,629,937 | B1 | * | 10/2003 | Watrous ....................... 600/586 |
| 6,782,373 | B1 | * | 8/2004 | de Tremiolles et al. ....... 706/15 |
| 6,895,338 | B1 | * | 5/2005 | Hsiung et al. ................. 702/22 |
| 2002/0150295 | A1 | * | 10/2002 | Kwok et al. ................. 382/186 |

OTHER PUBLICATIONS

Jorma Laaksonen, "Subspace Classifiers in Recognition of Handwritten Digits," May 1997, Helsinki University of Technology.*
David Price et, al. "Pairwise Neural Network Classifiers with Probability Outputs," 1994, Neural Information Processing Systems vol. 7.*
"Discriminant Adaptive Nearest Neighbor Classification", Trevor Hastie and Robert Tibshirani, Jun. 1996, IEEE Transactions on pattern analysis and machine intelligence, vol. 18, No 6, pp. 607-616.*
Robert P.W. Duin and David M.J. Tax, "Classifier Conditional Posterior Probabilities", Aug. 1998, 9 pages.
David D. Lewis and Jason Catlett, "Heterogeneous uncertainty Sampling for Supervised Learning", 9 pages.
A. Tuerk and S.J. Young, "Polynominal Softmax Functions for Pattern Classification", Cambridge University Engineering Department, Feb. 2001, 31 pages.
Eric B. Baum and Frank Wilczek, "Supervised Learning of Probability Distributions by Neural Networks", Institute for Theoretical Physics, University of California, 1988, 10 pages.

(Continued)

*Primary Examiner*—Anthony Knight
*Assistant Examiner*—Sergey Datskovskiy
(74) *Attorney, Agent, or Firm*—Amin & Turocy, LLP.

(57) ABSTRACT

Systems and methods are disclosed that facilitate producing probabilistic outputs also referred to as posterior probabilities. The probabilistic outputs include an estimate of classification strength. The present invention intercepts non-probabilistic classifier output and applies a set of kernel models based on a softmax function to derive the desired probabilistic outputs. Such probabilistic outputs can be employed with handwriting recognition where the probability of a handwriting sample classification is combined with language models to make better classification decisions.

22 Claims, 13 Drawing Sheets

OTHER PUBLICATIONS

Christopher C. Burges and David J. Crisp, "Uniqueness of the SVM Solution", 2000, 7 pages.

Morris H. Degroot and Stephen E. Fienberg, "Assessing Probability Assessors: Calibration and Refinement", Department of Statistics Carnegie-Mellon University, 1982, 13 pages.

John H. Miller, Rod Goodman, Padhraic Smyth, "On Loss Functions Which Minimize to Conditional Expected Values and Posterior Probabilities", IEEE Transactions on Information Theory, vol. 39, No. 4, Jul. 1993, 5 pages.

John S. Bridle, "Training Stochastic Model Recognition Algorithms as Networks can lead to Maximum Mutual Information Estimation of Parameters", Royal Signals and Radar Establishment, 1990, 7 pages.

Allan H. Murphy and Robert L. Winkler, "A General Framework for Forecast Verification", Monthly Weather Review, vol. 15, Dec. 18, 1996, 9 pages.

John C. Platt, "Probabilities for SV Machines", Microsoft Research, 2000, 13 pages.

T.J. Hastie and R.J. Tibshirani, Generalized Additive Models, Monographs on Statistics and Applied Probability, 1990, 335 pages.

R. Fletcher, "Practical Methods of Optimization", Second Edition, 1987, 436 pages.

* cited by examiner

PROBABILITY ESTIMATE FOR K-NEAREST NEIGHBOR

TECHNICAL FIELD

The present invention relates generally to the classification of patterns: more particularly, assigning class probabilities to novel input examples.

BACKGROUND OF THE INVENTION

Computer systems are ever increasingly employed to classify (e.g., recognize) objects. Classifiers or classification systems are typically employed to perform a variety of applications including identifying and/or classifying objects such as handwriting samples, medical images, faces, fingerprints, signals, automatic control phenomena, natural phenomena, nucleotide sequences and the like.

Classification systems often provide non-probabilistic outputs (e.g., object A belongs to class C). Such outputs are sufficient for some applications, but not others. Probabilistic outputs, also referred to as posterior probabilities, are required in many situations such as when combining classifiers with other knowledge sources, such as language models. The probabilistic output provides a probability for a class based on a given object or data point. Typically, this posterior probability is denoted by P(class|input).

One widely utilized, high-performance non-probabilistic classifier is the K nearest neighbor classifier (KNN). The KNN classifier is especially applicable for systems that operate with a relatively large numbers of classes (e.g., Asian handwriting recognition). As with other classifiers, the KNN classifier generates outputs that do not include probabilities. It would be advantageous to convert those outputs into usable probabilities. However, there fails to exist a suitable mechanism for converting the KNN classifier outputs into useful probabilities. Histogramming can sometimes be employed to generate probabilities from classifier outputs. However, there is often insufficient data to generate such probabilities with histogramming.

Another type of non-probabilistic classifier is a support vector machine (SVM). SVMs are a trainable classifier and are generally considered more accurate at classification than other classification methods in certain applications (e.g., text classification). They can also be more accurate than neural networks in certain applications such as reading handwritten characters for example. SVMs generate outputs that are uncalibrated values and do not include probabilities. Conventional approaches do exist to convert non-probabilistic outputs of SVM classifiers into probabilistic outputs. For example, a logistic function has been employed with SVM classifier outputs to convert the outputs into usable probabilities. However, the training speed of SVMs is often prohibitive for a large number of classes, so the KNN classifier is often preferred. However, conventional approaches fail to provide an adequate mechanism that convert non-probabilistic outputs of KNN classifiers into probabilistic outputs.

Probabilistic outputs can be produced by neural networks. A neural network is a multilayered, hierarchical arrangement of identical processing elements, also referred to as neurons. Each neuron can have one or more inputs and one output. The inputs are typically weighted by a coefficient. The output of a neuron is typically a function of the sum of its weighted inputs and a bias value (e.g., an activation function). The coefficients and the activation function generally determine the response or excitability of the neuron to input signals. In a hierarchical arrangement of neurons in a neural network, the output of a neuron in one layer can be an input to one or more neurons in a next layer. An exemplary neural network can include any suitable number of layers such as, an input layer, an intermediary layer and an output layer.

The utilization of neural networks typically involves two successive steps. First the neural network is initialized and trained on known inputs having known output values referred to as classifications. The network can be initialized by setting the weights and biases of neurons to random values, typically obtained via a Gaussian distribution. The neural network is then trained using a succession of inputs having known outputs referred to as classes. As the training inputs are fed to the neural network, the values of the coefficients (weights) and biases are adjusted utilizing a back-propagation technique such that the output of the neural network of each individual training pattern approaches or matches the known output to mitigate errors. Once trained, the neural network becomes a classifier to classify unknown inputs. By selecting a suitable function to specify cost of an error during training, outputs of a neural network classifier can be made to approximate posterior probabilities.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

Systems and methods are disclosed that facilitate producing probabilistic outputs also referred to as posterior probabilities. The probabilistic outputs include an estimate of classification strength. The present invention intercepts non-probabilistic classifier outputs and applies a set of kernel models, based on a softmax function, to derive desired probabilistic outputs. For example, a received data point is analyzed with respect to K-nearest neighbors, and a model is evaluated on the analyzed data. The model is trained via processing example inputs and outputs so as to train the model to provide probabilistic outputs, as compared to conventional schemes which simply provide non-probabilistic outputs. Such probabilistic outputs can be employed with handwriting recognition where the probability of a handwriting sample classification being above or below a given threshold might determine whether the sample is identified as the letter "j", the letter "i", or a stray pen mark altogether, for example. Additionally, by integrating with other sources of information, such as language models, the output of probabilities decreases likelihood of errors in handwriting recognition systems.

The present invention results in a probabilistic classification system that is well-informed and well-calibrated. Additionally, the invention maps non-probabilistic outputs to probabilistic outputs by employing a trained parametric model. The parameters of the model are trained via a suitable training set of data to provide probabilistic outputs in accordance with an acceptable test error amount.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
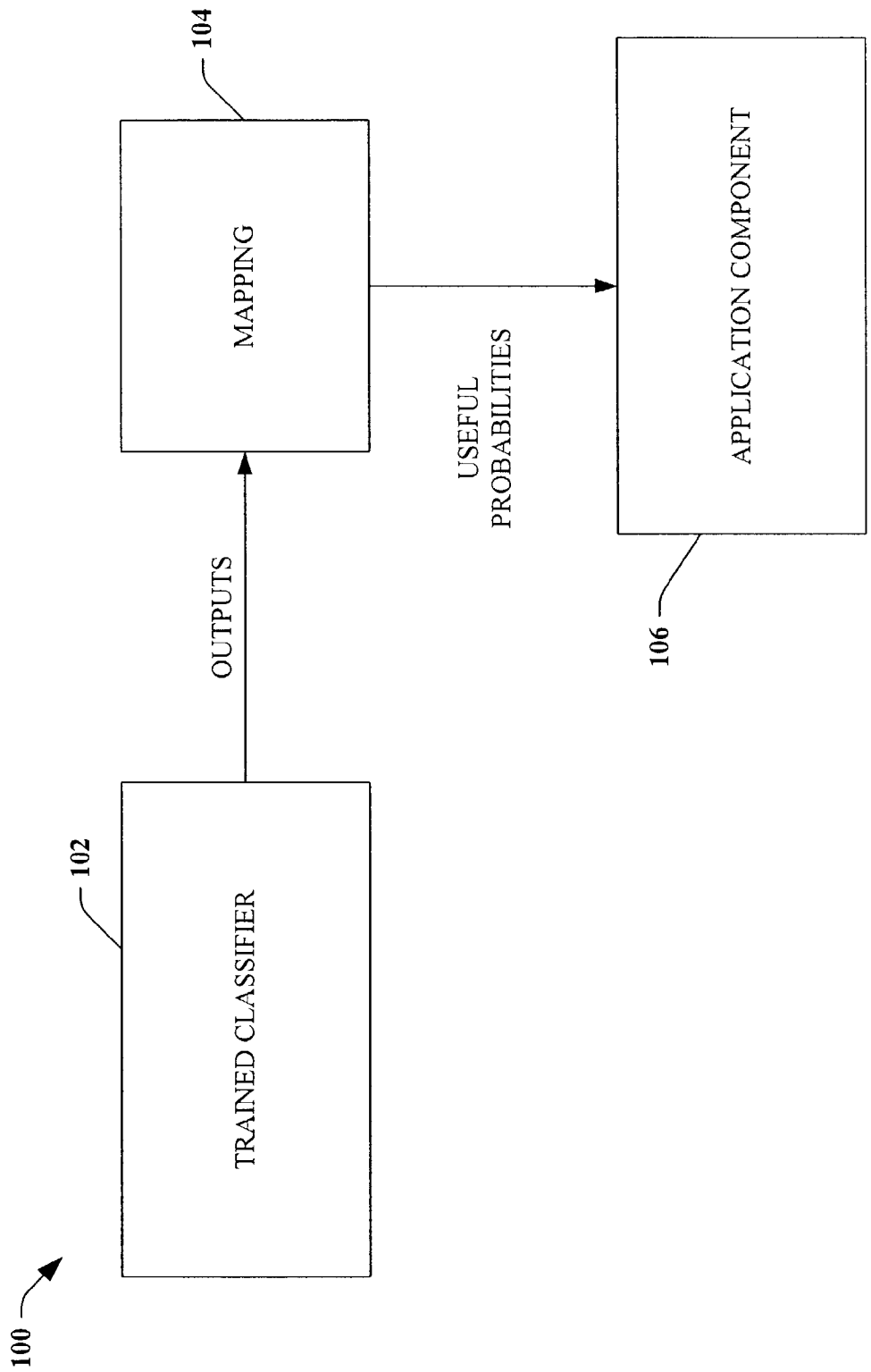
FIG. 1 is a block diagram illustrating a system that facilitates pattern recognition in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 is a block diagram that illustrates a system 100 in accordance with an aspect of the present invention. The system 100 facilitates producing probabilistic outputs also referred to as posterior probabilities—the probabilistic outputs include an estimate of classification strength. The present invention intercepts non-probabilistic classifier output and applies a learned parametric model to derive desired probabilistic outputs. For example, received data point(s) are analyzed with respect to K-nearest neighbors, and a model is built with the analyzed data. The model is trained via processing various inputs and outputs so as to train the model to provide probabilistic outputs from within acceptable error thresholds as compared to conventional schemes which provide non-probabilistic outputs. Probabilistic outputs are generated that can be employed in an application such as recognition of handwriting samples, medical images, faces, fingerprints, signals, automatic control phenomena, natural phenomena, nucleotide sequences and the like, for example.

The system 100 includes a trained classifier 102, a mapping component 104 and an application 106 and is described at a relatively high level to further illustrate the present invention. The system 100 can be implemented on a number of suitable devices such as, but not limited to, a personal computer, a personal digital assistant, a cellular telephone, a biometric device, and the like.

The trained classifier 102 receives a number of inputs and generates classifier outputs. The inputs can be feature vectors of objects to be classified. The classifier 102 is trained via a suitable training algorithm. A number of types of classifiers can be utilized, however a K nearest neighbor (KNN) type classifier is typically employed. For the KNN type classifier, a class of an input point is determined by measuring or determining distances of points in a database and obtaining the K nearest points (e.g., neighbors). Then, the class of those K nearest points is employed to determine the class of the input point (e.g., by a majority vote). Thus, the KNN classifier can provide as an output a distance of the input to K nearest points, the classes of the K nearest points, and/or the identities of the K nearest points.

The mapping component 104 converts the outputs from the trained classifier 102 into posterior probabilities, also referred to as probabilistic outputs. Generally, the mapping component 104 employs a probability model to convert or map the outputs from the trained classifier 102 into the posterior probabilities. The respective posterior probabilities are thus a function of a corresponding respective output and substantially all of the other outputs of the trained classifier 102.

A parametric model is employed by the mapping component 104 to perform the mapping. The parametric model has a varying number of parameters that are learned or trained. Once the parameters are trained (e.g., via a second training set disjoint from a first training set used to train classifier 102), the parametric model permits the mapping component 104 to compute probabilities from the classifier outputs. It is appreciated that the parametric model utilizing learned parameters is generally more accurate and efficient than an approach such as majority rule, wherein a posterior probability can be estimated by employing relative frequencies of occurrence(s) of a given class.

The application component 106 is operative to receive the posterior outputs from the mapping component 104. The application component 106 then employs the posterior outputs to perform a function such as, for example, handwriting recognition, medical image diagnoses (e.g., determining whether an image identifies a tumor), speech recognition, image compression and the like.

Figure 2:
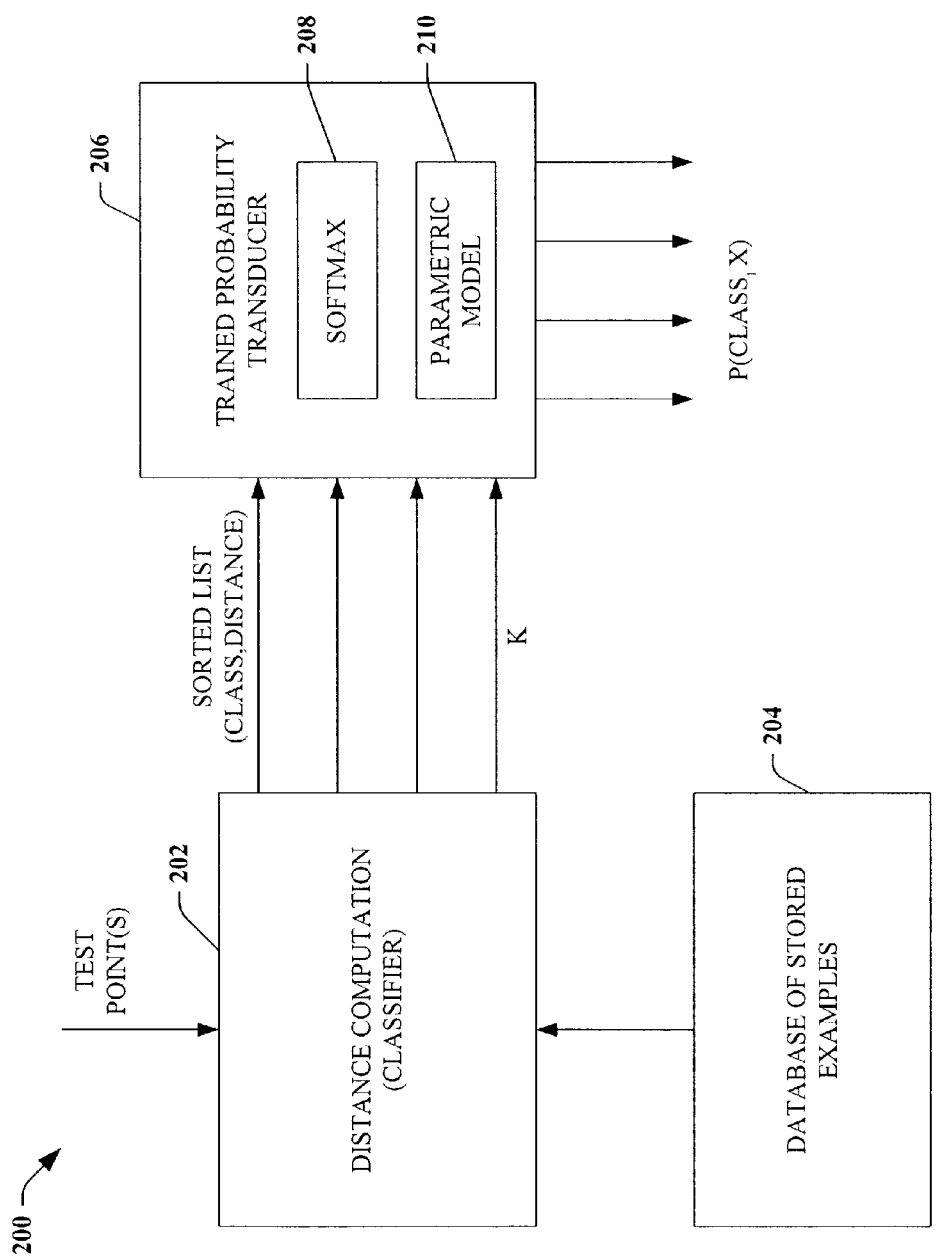
FIG. 2 is a block diagram illustrating a system that facilitates generation of posterior probabilities in accordance with an aspect of the present invention.

Turning now to FIG. 2, a block diagram of a system 200 that facilitates generation of posterior probabilities is depicted. The system 200 is similar to that of FIG. 1, but is described at a more detailed level. The system includes a distance computation component 202, a database of stored examples 204 and a trained probability transducer 206. The system 200 is computationally efficient and adjustable in that speed and accuracy can be traded off. Furthermore, the system 200 can also be referred to as a probabilistic classifier in that the system 200 produces probabilistic outputs that include class information. Additionally, the system 200 can be further referred to as a pattern recognition system.

The distance computation component 202 is a piecewise constant classifier and is operative to classify inputs without providing probabilities. The distance computation component 202 employs a K nearest neighbor (KNN) approach. The distance computation component 202 receives a number of inputs and generates K outputs. The K outputs each comprise a class, a distance, and/or an index of one of the K closest examples stored in database 204. The K outputs are sorted or ranked according to increasing distance to the inputs. Additionally, the K outputs are also referred to as a classifier output vector. The inputs are feature vectors of objects to be classified. The classifier and/or the system 200 is trained via a suitable training mechanism, typically via a P-admissible loss function, such that the outputs meet error requirements for a desired task.

The trained probability transducer 206 receives the K outputs from the distance computation component 202 and maps or converts the K outputs into posterior probabilities also referred to probabilistic outputs. The posterior probabilities can then be employed for a suitable application (e.g., such as handwriting analysis). The trained probability transducer 206 comprises a softmax function 208 and a parametric model 210.

The distance computation component 202 is generally implemented as a KNN classifier. As discussed with respect to FIG. 1, a KNN type classifier is particularly suitable for implementations involving large numbers of classes. For the KNN type classifier, a class of an input point is determined by measuring or determining distances of points in database 204 and obtaining the nearest points (e.g., neighbors). Then, the classes of those K nearest points are employed to determine the class of the input point or of a given point. Additionally, the distance computation 202 component can utilize kernels to transform the distances between test points and stored examples in database 204 into output values suitable for input to the parametric model 210. For example, one suitable kernel takes the exponential of the negative of a scaled Euclidean distance of a test point to a stored example and produces a Gaussian similarity measure between the test point and the stored example. Another such kernel can always produce a value of 1, as long as the stored example is in the K nearest stored examples to the test point.

The parametric model 210 can be implemented in a number of different embodiments, three of which are further described infra. The parametric models in each of the three embodiments comprise trained or learned parameters. The probability transducer 206 is trained via a suitable training method (e.g., minimizing a P-admissible loss function). Generally, a number of test points are input and the outputs are compared with expected results. Component parameters such as weights, coefficients and functions are adapted so as to produce outputs within a tolerable amount of error.

The system 200 is trained and developed such that it is well-informed and well-calibrated. Generally, a well-calibrated classifier is one for which, as the amount of training data increases (e.g., number of training points), the predicted probabilities converge to the measured frequencies. A well-informed classifier is one such that if an algorithm is employed to convert the classifiers outputs to probabilities, then the test error should not increase if the predicted posteriors are employed instead of the original (e.g., expected) outputs. Calibration and informativeness are typically somewhat dependent on each other. Thus, if the modeled or generated posterior probabilities are equal to the true or actuation probabilities, the resulting probabilities are well-informed and well-calibrated.

Another factor to be considered for the training of probability transducer 206 is P-admissibility, which is correlated with informativeness and calibration. It is desirable that the error metric to train probability transducer 206 is P-admissible, which generally results in a classifier that is well informed and well calibrated. A P-admissible loss function $L(y,y')$ is a function which, for any given x, is minimized at $y'=E[y|x]$, where $E[y|x]$ denotes the expectation of y for a fixed, given value of x. Additionally, for the case of a single output variable, if probability transducer 206 does not have sufficient capacity to learn the true posterior, it still comes relatively close to the solution in the sense that minimizing the expectation of a P-admissible loss function over the joint distribution of x and y is equivalent to first replacing y by $E[y|x]$ and then minimizing the expectation of the loss function over the marginal distribution $p(x)$.

The probability transducer 206 is trained utilizing a set of training points separate from those stored in the database of stored examples 204. This is performed to circumvent an inherent bias that can be present in a trained KNN classifier (for example, if a trained KNN classifier is used to classify the data upon which it was trained, the 'closest' point to a given point x will be x itself, with distance zero, which is unlikely to occur on unseen test data). These separate training points are labeled as to correct class. The posterior probabilities generated by the trained probability transducer 206, also referred to as posteriors, are modeled utilizing the softmax function 208, also referred to as a softmax map, as follows:

$$P(c_j | x) = \frac{e^{z(x, c_j, \alpha)}}{\sum_i e^{z(x, c_i, \alpha)}} \quad (2)$$

The softmax map is a convenient tool to map the range of $\{z: -\infty \ldots \infty\}$ to $[0,1]$. The variable $c_j$ in the numerator on the right hand side of (2) represents a hypothesized class of an input point, x represents a feature vector generated from the input point, $c_i$ in the denominator of the right hand side of (2) represents classes of neighboring points, $\alpha$ represents parametric weights; and $z(\ )$ is the output of a trained parametric model 210 relating distance and class information. Note that the structure of the model resides in the choice of functional dependence of z on the x, $c_j$, and $\alpha$. A regularized log likelihood of the class labels is employed for the objective function, which is sought to be maximized (note that, dropping $\alpha$-independent terms, this is equivalent to maximizing the regularized negative cross entropy):

$$F = \sum_{i=1}^{m} \sum_{j=1}^{C} P_t(c_j | x_i) \log P(c_j | x_i) - g(\alpha) \qquad (3)$$

where $g(\alpha)$ is a regularization function and $P_t(c_j|x_i)$ is the true posterior probability. Assuming data is utilized without label noise, permits that $P_t(c_j|x_i) = \delta_{c_j \bar{c}_i}$ where $\bar{c}_i$ denotes the true class of point $x_i$, and where $\delta_{c_j \bar{c}_i}$ is defined to take the value 1 if $c_i = c_j$ and zero otherwise, and the objective function becomes:

$$F = \sum_{i=1}^{m} \log P(\bar{c}_i | x_i) - g(\alpha) \equiv \sum_{i=1}^{m} F_i - g(\alpha) \qquad (4)$$

Figure 3:
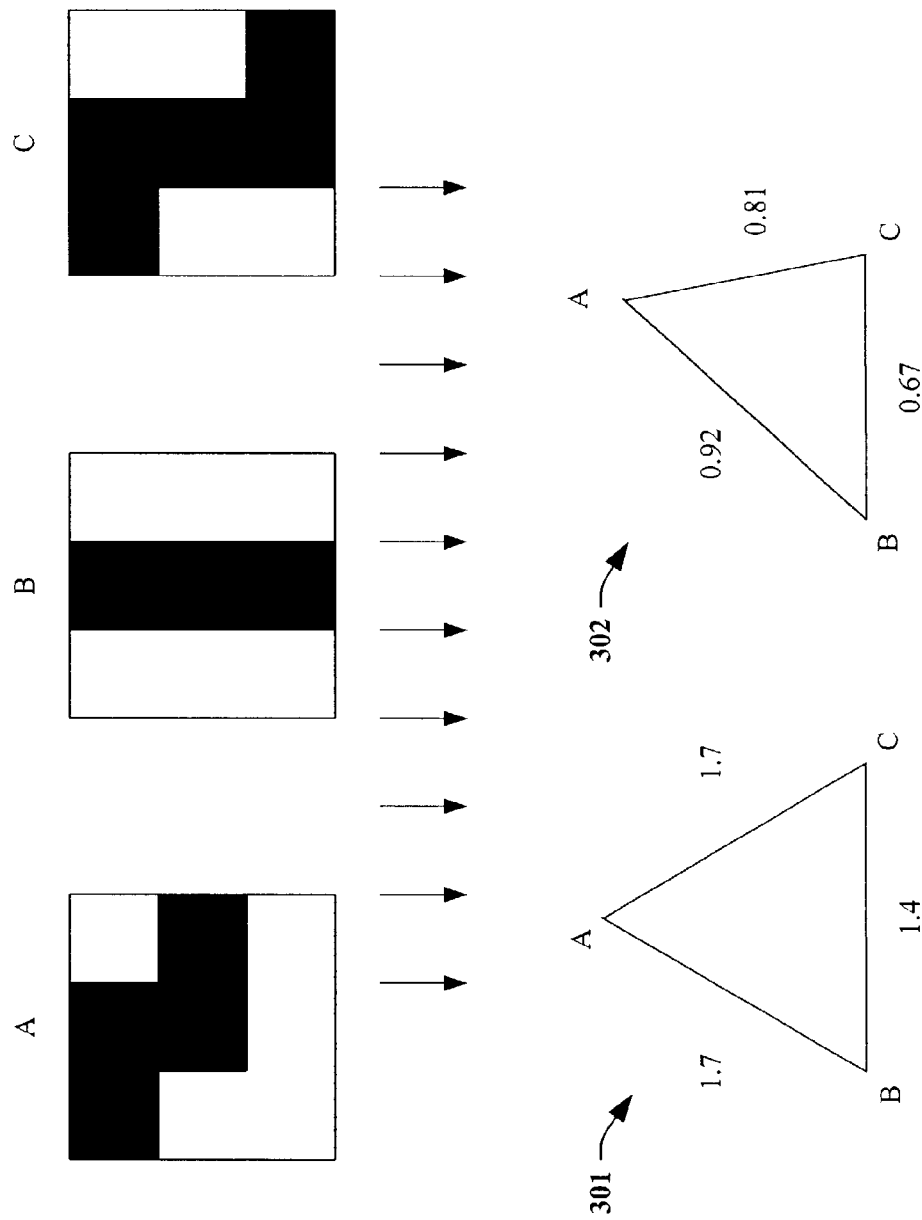
FIG. 3 is a block diagram illustrating normalization in accordance with aspects of the present invention.

It is additionally appreciated that the data processed by the distance computation component 202 can be first normalized to further mitigate test errors. The data is normalized such that each point lies on a unit sphere ("unit norming"). This alleviates the problem of a bias that can occur with an ordinary Euclidean norm for handwriting applications, due to the fact that some digits (e.g., 2 and 8) have on average much more ink than others (e.g., digit 1). An example of unit norming is depicted in FIG. 3. With a Euclidean normalization, pattern A is equidistant to B and C. With unit normalization, pattern A is closer to C. Euclidean normalization 301 and unit normalization 302 distances are illustrated below the patterns. Experiments with and without unit norming demonstrate an advantage for unit norming.

Figure 4:
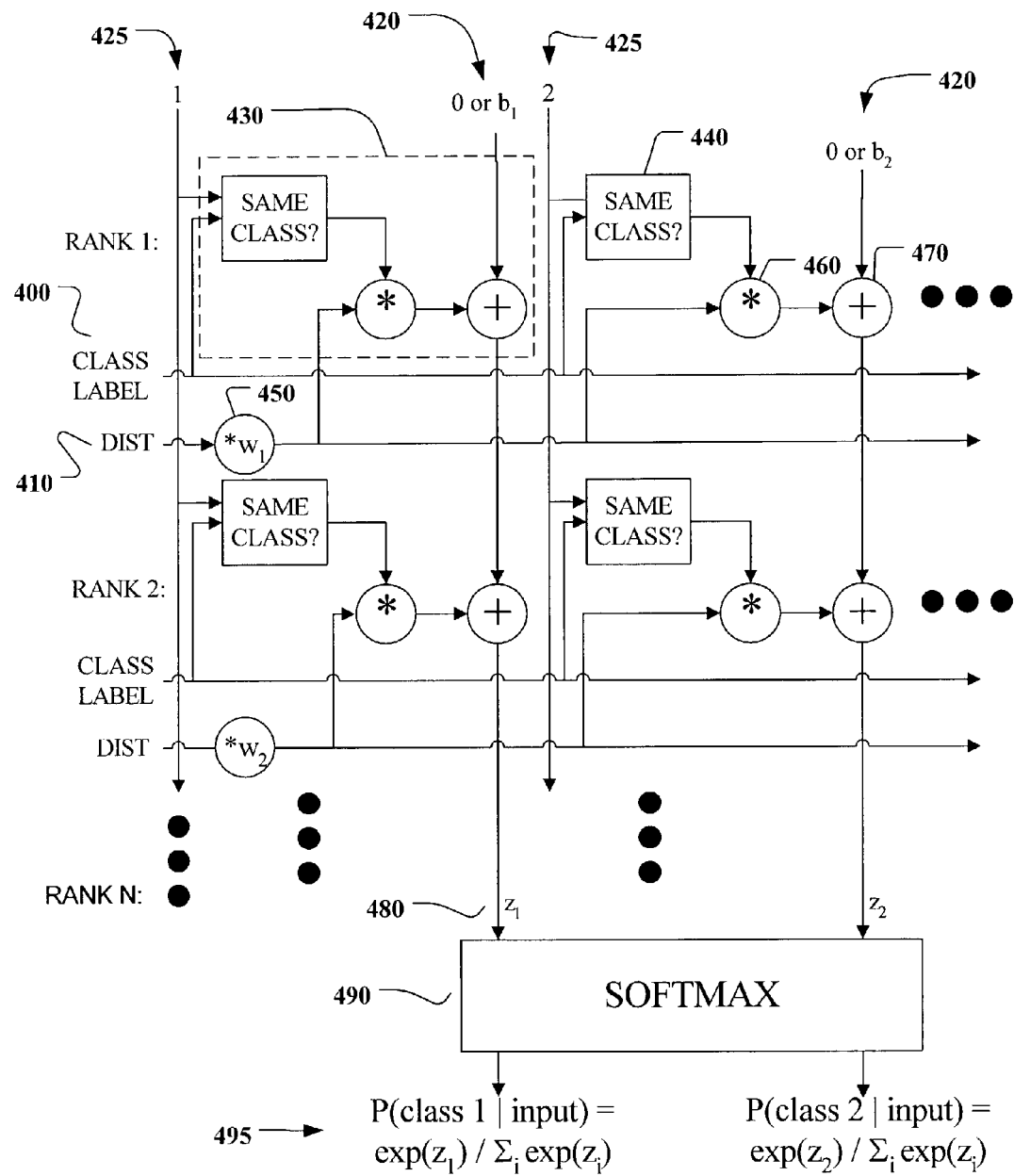
FIG. 4 is a diagram illustrating an approach for a trained probability transducer in accordance with an aspect of the present invention.
Figure 5:
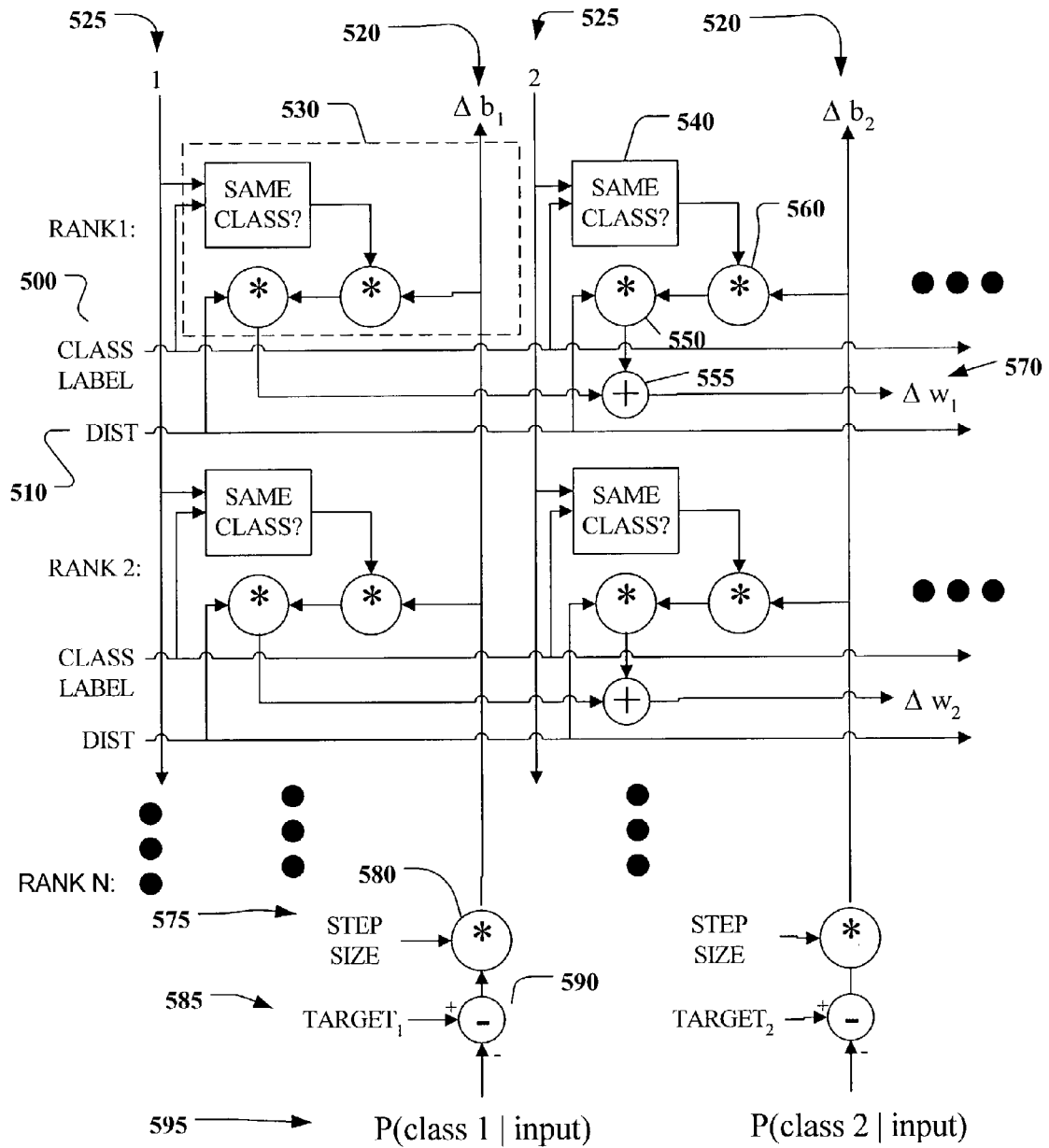
FIG. 5 is a diagram illustrating an update rule for training a trained probability transducer in accordance with an aspect of the present invention.
Figure 6:
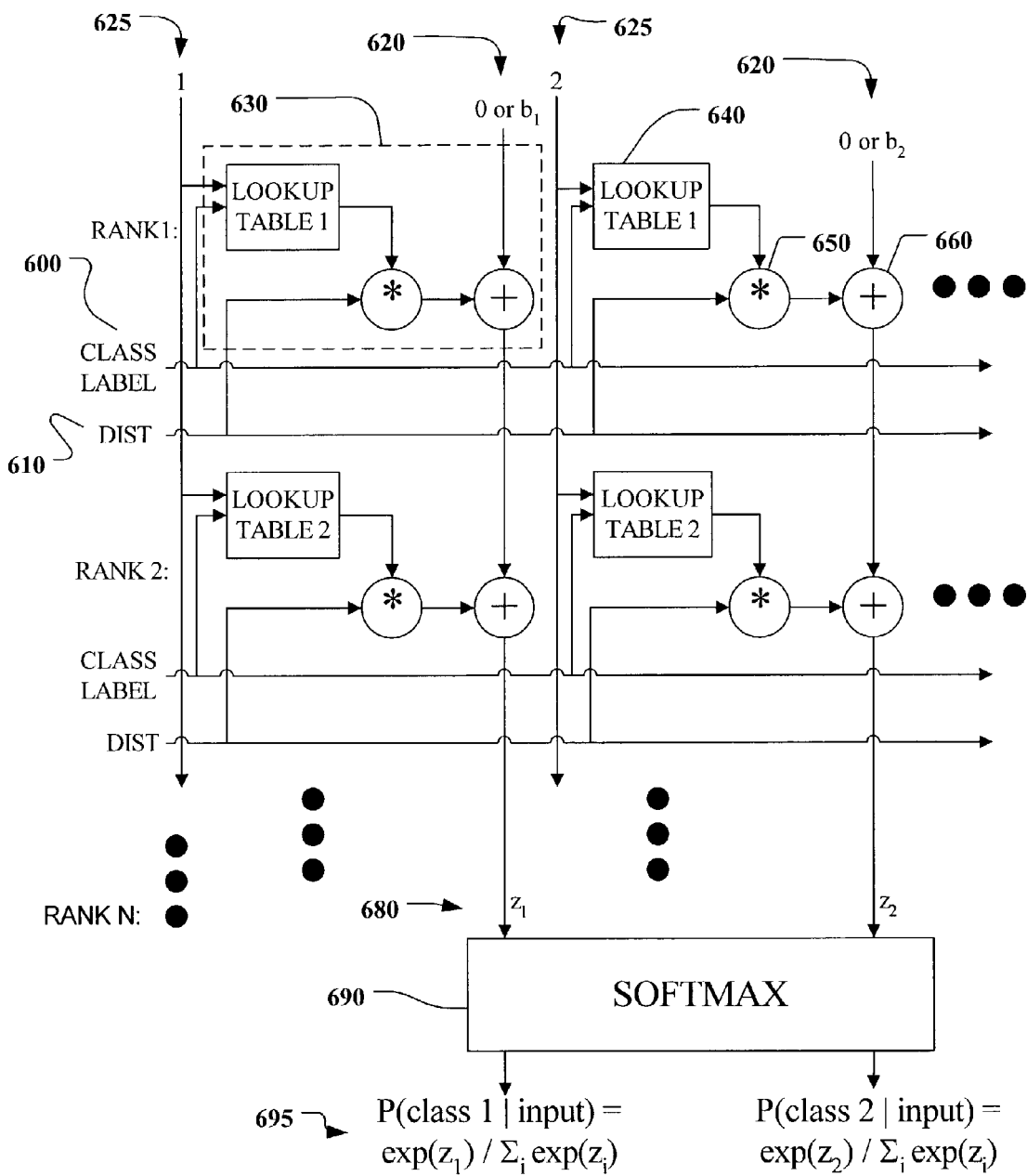
FIG. 6 is a diagram illustrating an approach for a trained probability transducer in accordance with an aspect of the present invention.
Figure 7:
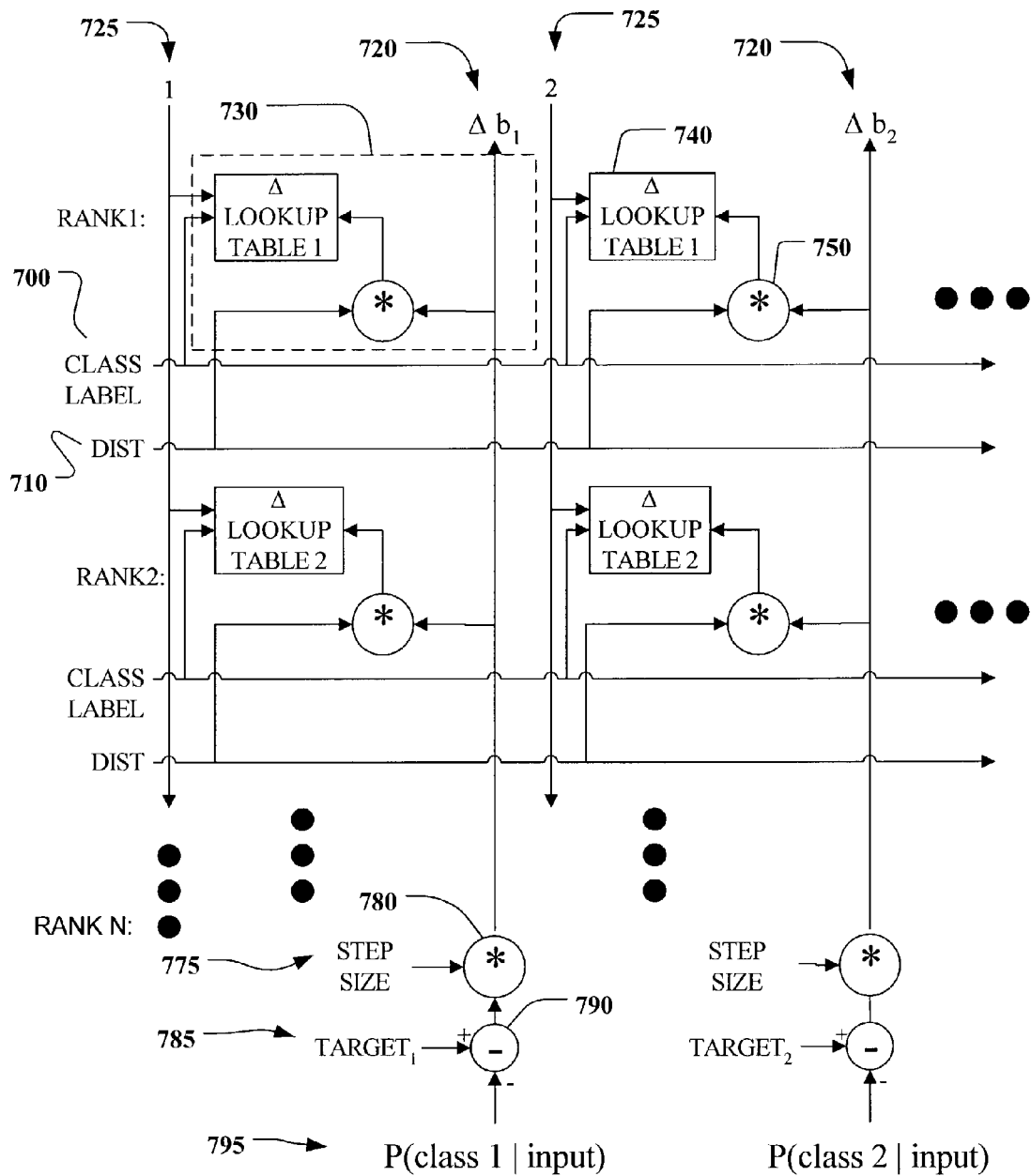
FIG. 7 is a diagram illustrating an update rule for training a trained probability transducer in accordance with an aspect of the present invention.
Figure 8:
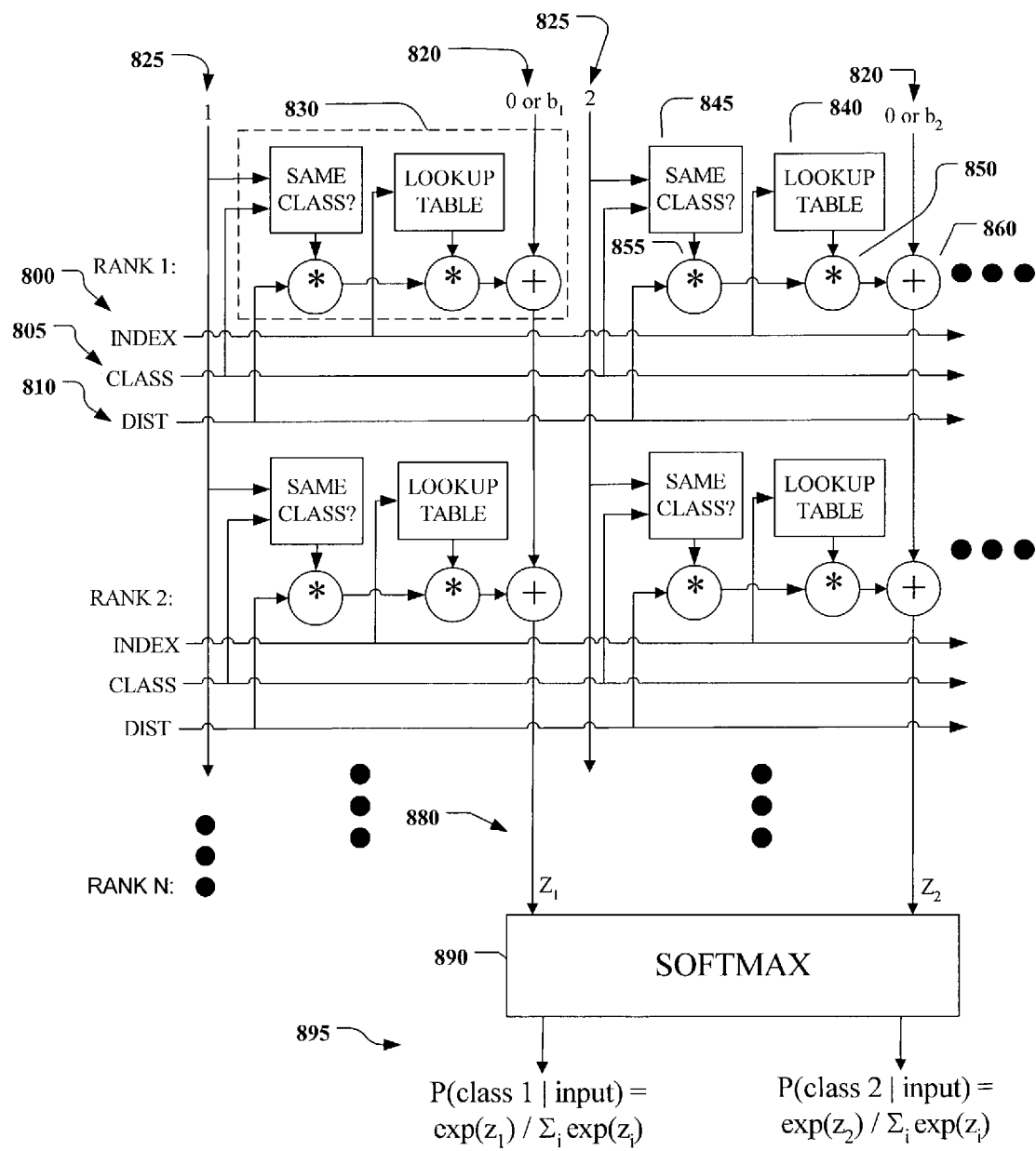
FIG. 8 is a diagram illustrating an approach for a trained probability transducer in accordance with an aspect of the present invention.
Figure 9:
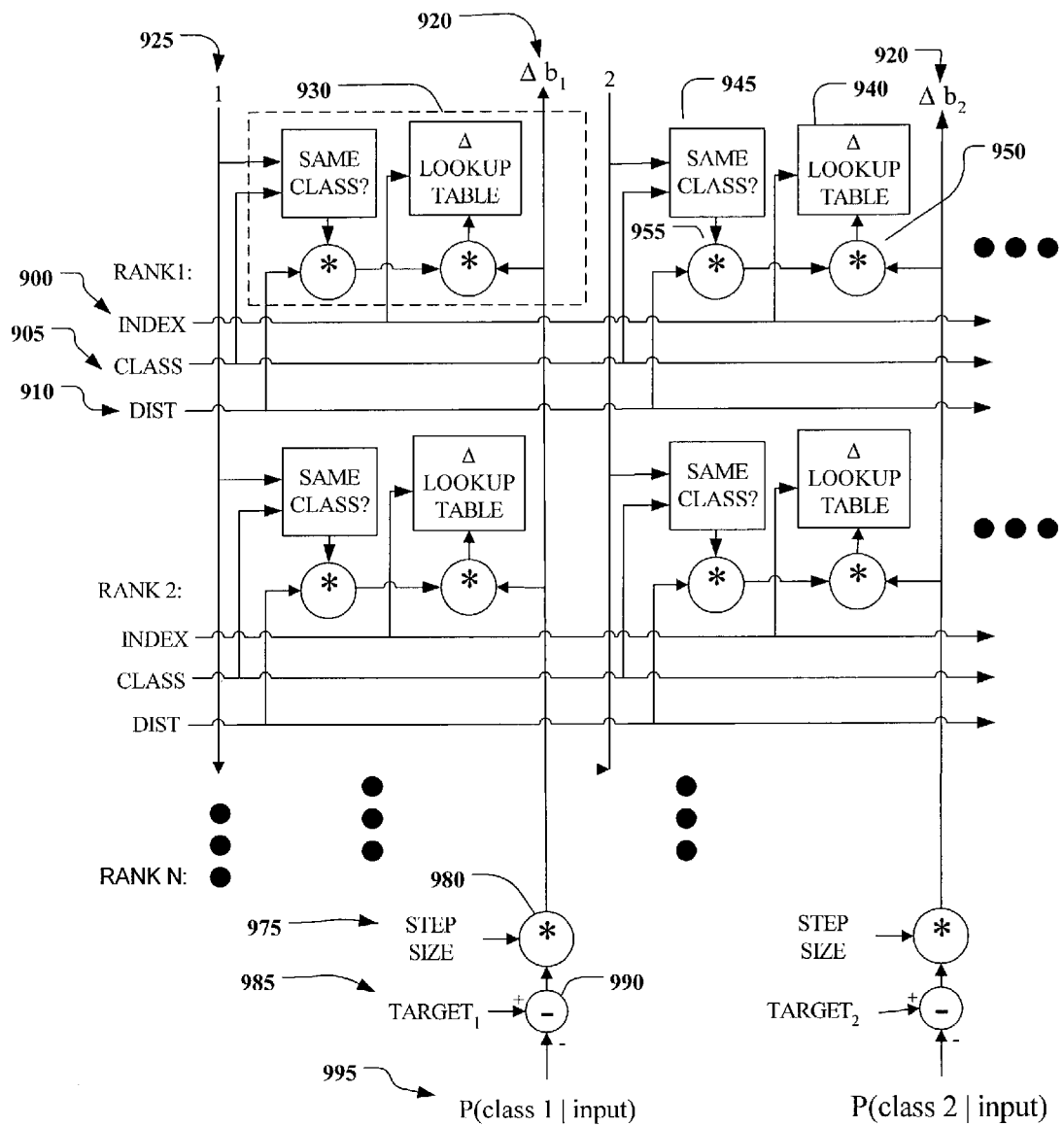
FIG. 9 is a diagram illustrating an update rule for training a trained probability transducer in accordance with an aspect of the present invention.

We now turn to three different approaches for implementing the probability transducer 206, which exploit different models as the parametric model 210. These approaches of probability transducer 206 are depicted in FIGS. 4, 6, and 8. These approaches can be trained via stochastic gradient descent of the objective function in equation (4). The training of the embodiment of FIG. 4 is shown in FIG. 5. The training of the embodiment of FIG. 6 is shown in FIG. 7. The training of the embodiment of FIG. 8 is shown in FIG. 9.

For all three approaches, the probability transducer 206 accepts K outputs from distance computation 202 along K rows of the FIGS. 4, 6, and 8. Thus the $N^{th}$ row in FIGS. 4, 6, and 8 corresponds to the $N^{th}$ nearest neighbor, in rank order, to the input point. Each column in FIGS. 4, 6, and 8 corresponds to a particular hypothesized class for the input point: specifically, each of the C columns (classes) of FIGS. 4, 6, and 8 computes the output of the parametric model for a particular class. Thus, the three approaches comprise a plurality of rank-class computations, each of which lie on an intersection of a row and a column. A rank-class computation contains a model of how a single ranked output of the distance computation 202 influences the probability of a single class. The three approaches utilize varied rank-class computations.

Turning now to FIG. 4, a first approach for implementing the trained probability transducer 206 is illustrated. In FIG. 4, each output from the distance computation component 202 is depicted as comprising a class label 400 of the corresponding element in the database 204, and a distance 410 of the test point to the corresponding element in database 204. Recall that the distance computation component 202 can use a kernel to transform the true distance into a form suitable for input to the parametric model 210. In FIG. 4, each distance 410 is multiplied by a weight (a learned parameter) corresponding to its row. This multiplication is carried out by multiplier 450.

In FIG. 4, each rank-class computation 430 first compares the class label 400 to the class of the column 425 by component 440. Component 440 produces a+1 if they are the same class, and −1 otherwise. The result of component 440 is multiplied by the output of multiplier 450. This multiplication is performed by multiplier 460. The output of multiplier 460 is added to a partial sum 420 by adder 470. When the rows have contributed to the partial sum 420, the result is an output 480 ($z_i$) of the parametric model 210. Outputs for every column are then supplied to the softmax component 490 to produce a posterior probability for every class 495, where $\Sigma_i$ denotes sum over index i.

There are alternatives for the initialization of partial sum 420. One alternative is to initialize it to zero. The preferred alternative is to initialize each partial sum 420 to a separate learned parameter, one per column (class).

FIG. 5 illustrates an update rule for the trained parameters depicted in FIG. 4. For FIG. 5, the K outputs are computed by sequentially applying the distance computation 202 to a second training set, separate from the training set used to create the database of stored examples 204.

Posterior probability 595 is computed by applying the probability transducer in FIG. 4 to the same example in the second training set that is providing the K distance outputs. The target probability 585 is the known probability that the current example in the second training set belongs to the class corresponding to the current column. An error signal is produced by subtracting the target probability 585 from the computed posterior probability 595. This subtraction is performed by subtractor 590. The error signal is scaled by a step size 575. This scaling is performed by multiplier 580. The scaled error signal is then supplied to the rank-class update computations 530 in the corresponding column. The scaled error is also applied at 520 to adjust the learned parameter that initializes the partial sum 420, if such a learned parameter is used in FIG. 4. For the update of the partial sum initialization parameter, the scaled error rate can be multiplied by an additional constant, to allow for the fact that the number of contributions to an update of the partial sum initialization parameters is different than the number of contributions to an update of the weight parameters, at a given iteration of the training process Each rank-class update computation 530 compares the class 500 of the stored example in database 204 corresponding to its row to the class 525 of its column. This comparison is performed by component 540. The result of this comparison is +1 if the classes are the same, and −1 if they are different. The result of the comparison is multiplied by the scaled error at multiplier 560. Multiplier 550 then multiplies the result of multiplier 560 by the distance 510 of the example in database 204 to the current example in the second training set. Again, this distance may be modified by a kernel function. Finally, the output of the multipliers 550 are summed by adders 555 to produce an update for the weight parameter corresponding to the appropriate row.

It can be appreciated by those skilled in the art that FIG. 5 implements a stochastic gradient descent algorithm. Other suitable optimization algorithms can be also be employed in accordance with the subject invention. FIG. 5 can be modified to compute a complete gradient by removing multiplier 580 and accumulating the updates for the parameters over the second training set. Alternatively, P-admissible error metrics other than shown in equation (4) can be used.

Turning now to FIG. 6, a second approach for implementing the trained probability transducer 206 is depicted. FIG.

6 is analogous to FIG. 4, except that the form of the rank-class computation 630 is altered, and multiplier 450 is not utilized. Thus, some description is omitted for brevity. Class label 600 is analogous to class label 400. Distance 610 is analogous to distance 410. Column class label 625 is analogous to column class label 425. Initialization of the partial sum 620 is analogous to initialization of the partial sum 420. Parametric model output 680 is analogous to parametric model output 480. Softmax component 690 is analogous to softmax component 490. Posterior probability output 695 is analogous to posterior probability output 495.

Rank-class computation 630 uses class label 600 and column class label 625 to look up a value in a lookup table 640. The values in this lookup table depend on the row of the rank-class computation 630. If the number of possible classes is C, then the number of entries in each lookup table is $C^2$. The index set of the lookup table is the Cartesian product between the possible class labels 600 and column class labels 625. The values in lookup table 640 are trained parameters, and are updated by the process described in FIG. 7.

The value selected by lookup table 640 is multiplied by the distance 610 of the corresponding row. This multiplication is performed by multiplier 650. Adder 660 then takes the output of multiplier 650 and adds it to partial sum 620 for further computation.

FIG. 7 depicts an update rule for the trained parameters depicted in FIG. 6. FIG. 7 is similar to FIG. 5, except that the rank-class update computation 730 is altered, and there is no update of a per-row weight. As such, redundant descriptions are omitted for sake of brevity. Class label 700 is analogous to class label 500. Distance 710 is analogous to distance 510. Column class label 725 is analogous to column class label 525. Update of per-column parameter 720 is analogous to update of per-column parameter 520. Computation of the error signal by entities 775, 780, 785, 790, and 795 are analogous to computation of the error signal by entities 575, 580, 585, 590, and 595.

Rank-class update computation 730 multiplies the distance 700 of its row (ranked output point) by the scaled error of its column (class). This multiplication is performed by multiplier 750. The result of the multiplication is provided to the update of the lookup table, 740. The lookup table update 740 will modify one entry of each lookup table 640 for rank-class update computation(s) 730. The index of the modified entry is computed by combining the class label 700 of the row with the column class label 725, in the same manner as the index is computed by lookup table 640. The corresponding entry is the adjusted by the output of multiplier 750.

FIG. 7 computes a stochastic gradient descent of the error metric in equation (4). Analogous to FIG. 5, a different optimization method or a different P-admissible error metric can be used.

Turning now to FIG. 8, a third approach for implementing the trained probability transducer 206 is depicted. As with the other approaches (FIGS. 4 and 6), each row corresponds to an output from the distance computation component 202, sorted by rank, and each column corresponds to a particular class. According to this approach, the trained parametric model 210 comprises a plurality of rank-class computations 830.

For this approach, the distance computation component 202 is operative to produce, for each rank, an index 800 which identifies the Nth closest point in the database of stored examples 204 to the input point, a class label 805, which is the class of the Nth closest point in the database of stored examples 204; and a distance 810, which is the distance of the Nth closest point in the database of stored examples 204 to the input point. Again, the distance 810 may be computed via a kernel function. The initialization of the partial sum 820 is analogous to the initialization of the partial sum 420 in FIG. 4. The computation of the posterior probability 895 by softmax component 890 from the output 880 of the parametric model is analogous to the computation of the posterior probability 495 by softmax component 490 from the output 480.

Each rank-class computation 830 compares the class 805 of the Nth closest point to the class label 825 for its column. This comparison is performed by class determination component 845. The class determination component 845 produces a 1 if they are the same class, and a 0 otherwise. The value produced by the determination component 845 is multiplied by the distance 810. This multiplication is performed by multiplier 855. The result of this multiplication is multiplied by the output of the lookup table 840. The index used by the lookup table is the index 800 of the Nth closest point. There is a lookup table entry for each example in the database of stored examples 204. The multiplication of the lookup table result is performed by multiplier 850. The result of multiplier 850 is then added to the partial sum 820 by adder 860.

It can be appreciated by someone of ordinary skill in the art that if one of the multiplicands used by multiplier 855 is 0, the output is zero and hence the value added by adder 860 will also be zero. Therefore, only one of the rank-class computations 830 per row needs to be performed: the one occuring in the column whose class is equal to class 800 for the row. All other rank-class computations can be skipped. This approach uses only K rank-class computations 830, rather than KC rank-class computations in the other approaches, where K are the number of outputs of the distance computation component 202 and C is the number of classes.

It can also be appreciated that the rows of FIG. 9 are not distinguished: the same computation occurs on every row. Therefore, for such approach, the output of the distance computation component 202 need not be ranked.

FIG. 9 shows an update rule employed to train the implementation of the probability transducer 206 depicted in FIG. 8. It is analogous to the training update shown in FIG. 7, except that each output from distance computation 202 is here an index 900 of the Nth closest example to a point in the second training set, a class 905 of the same example, and a distance 910 of the same example. Analogous to the computation of posterior probability 795 in FIG. 7, the posterior probability 995 is computed by the process in FIG. 8 from the same point in the second training set that is also supplied to the distance computation component 202. The computation of the scaled error signal by components 975, 980, 985, and 990 is analogous to the computation of the scaled error signal in FIG. 7 by components 775, 780, 785, and 790. The update of the partial sum 920 is analogous to the update of the partial sum 720. The rank-class update computation 930 first compares the class 905 to the class label 925 for the column. This comparison is performed by determination component 945. The determination component 945 produces a 1 if they are the same, and a 0 otherwise. The result of the determination component 945 is multiplied by distance 910. This multiplication is performed by multiplier 955. The result from multiplier 955 is multiplied by the scaled error. This multiplication is performed by multiplier 950. The result of multiplier 950 is used by component 940 to update an entry in the lookup table. The index of the updated entry is the index 900.

As in FIG. 8, the rank-class update 930 only needs to be performed if the class 905 is the same as the class label 925 for the column. The other rank-class updates for that row can be skipped, because the result of multiplier 950 will always be zero. Therefore, only one rank-class update 930 needs to be performed per row.

The three approaches described above and illustrated in FIGS. 4–9 can be further illustrated with the following exemplary mathematical description(s). It is to be appreciated that the invention is not limited to such mathematical description(s), and discussion with respect thereto is merely being provided to facilitate understanding of the invention in accordance with specific implementations. The first approach, described by FIGS. 4 and 5 is further illustrated via the first model and the second model. The second approach, described by FIGS. 6 and 7 is further illustrated via the fourth model. Finally, the third approach, described by FIGS. 8 and 9 is further illustrated via the third model. The foregoing discussion with respect to FIGS. 4–9 as well as the following discussion is for illustrative purposes and is not intended to limit the present invention. It is appreciated that variations of the below models can be employed in accordance with the present invention.

The first model that can be utilized with the trained probability transducer 206 as the parametric model 208 is a "sparse rank ordering model." This model enforces sparseness by construction as follows. For a kernel $K(x,x_i)$, this model depends on the rank ordering of the nearest neighbors, and on the class labels of those nearest neighbors:

$$z(x, c) = \sum_{i \in I_N(x)} (w_{r_i}\delta_{\overline{c_i},c} + v_{r_i}(1 - \delta_{\overline{c_i},c}))K(x, x_i) \qquad (5)$$

where the parameters $w_{r_j}$ and $v_{r_j}$ are weights that are learned by training, and where $I_N(x)$ denotes the index set of the N nearest neighbors to the point x, and where the subscript $r_i$ denotes the rank of $x_i$ in the list of the N nearest neighbors. This model has only N free parameters (further discussed below), thus the additional computation beyond that required to find $I_N$ is minimal. The regularization function $g(\alpha)$ is set to zero (Eq. 4) since the number of parameters is small. F is then bounded above by zero, and at zero corresponds to the probability one being assigned to the correct class for every training pattern. By assigning a target probability of one for the correct class and zero for other classes, the update rule for the ith pattern is:

$$\Delta w_{r_j} = \epsilon K(x_i,x_j)(\delta_{\overline{c_j},\overline{c_i}} - P(\overline{c_j}|x_i)) = -\Delta v_{r_j} \qquad (6)$$

Note that if Eq. 6 starts with $w_{r_j} = v_{r_j} = 0 \forall j$, then $v_{r_j} = -w_{r_j}$ always, so the model has just N parameters to learn (corresponding to the weight parameters 450 in FIG. 4) and Eq. (6) becomes:

$$z(x_i, c) = \sum_{j \in I_N(x)} w_{r_j} K(x_i, x_j)(2\delta_{\overline{c_j},c} - 1) \qquad (7)$$

A second model that can be employed with the trained probability transducer 206 as the parametric model 208 is an "adding class dependence model." The first model described supra fails to parameterize per-class dependence; z(x,c) gets positive or negative contributions according to whether the class of the training point under consideration is the same, or not as c. However, such per-class information could be useful, for example, to model easily confused classes. Thus, C parameters $b_c$ are added to the model (corresponding to the partial sum initialization parameters 420 in FIG. 4):

$$z(x, c) = \sum_{i=1}^{N} (w_{r_i}\delta_{\overline{c_i},c} + v_{r_i}(1 - \delta_{\overline{c_i},c}))K(x, x_i) + b_c \qquad (8)$$

The update rules for the second model are as they are for the first model, but with the addition of $\Delta b_c = \epsilon'(\delta_{c,c_i} - P(c|x_i))$, where the update to the parameters $b_c$ are given their own step size $\epsilon'$, to allow for the fact that the number of contributions to an update of the $b_c$ parameters is different than the number of contributions to an update of the w parameters, at a given iteration of the training process. As with the first model, $v_{r_j} = -w_{r_j}$, giving:

$$z(x, c) = \sum_{i=1}^{N} w_{r_i} K(x, x_i)(2\delta_{\overline{c_i},c} - 1) + b_c \qquad (9)$$

as a suitable representative equation for the second model.

A third model that can be utilized with the trained probability transducer 206 as the parametric model 208 is a "per-point class model." Here, the equation employed is:

$$z(x, c) = \sum_{j \in I_N(x), \overline{c_j}=c} w_j K(x, x_j) + b_c \qquad (10)$$

For this model, one parameter is utilized per training point, which corresponds to an entry in lookup table 830 of FIG. 8. The idea is to use the weights to model the value of each training point in predicting its own class. However, it is appreciated that rank information is not required with the third model. The indicator function is defined as, $\delta_i(x_j)$ to be a 1 if $x_i \in X_N(x_j)$ (where $X_N(x_j)$ denotes the set of N points closest to $x_j$), 0 otherwise and the training update rules become $\Delta W_i = \epsilon \delta_i(x_j) K(x_j, x_i)(2\delta_{\overline{c_i},\overline{c_j}} - P(\overline{c_i}|x_j))$ and $\Delta b_c = \epsilon'(\delta_{c,\overline{c_j}} - P(c|x_j))$. Note that the $b_c$ and $w_i$ are again given different learning rates. Since after one training epoch, the mean number of $w_i$ updates per $w_i$ parameter is N, and the mean number of $b_c$ updates per $b_c$ parameter is m, and assuming that $\partial F_j/\partial w_i$ and $\partial F_j/\partial b_c$ are of roughly the same size, requiring that the mean size of the updates also be roughly the same yields $\epsilon' = \epsilon(N/m)$. This is necessary to ensure that choice of a suitable learning rate for the $w_i$ results in a suitable learning rate also for the $b_c$.

Although the number of parameters for the third model is large, in an evaluation phase, only O(N+C) operations are needed. The small number of parameters used to classify a given point permits not using a regularization term for the third model.

A fourth model that can be employed with the trained probability transducer 206 is a combined "Rank/Class/Class model" (RCC model). If the $w_{r_j}$ is permitted to vary based on class as well as rank, then a class-dependent rank ordering can be learned. For example, suppose that N=3 and that a given test point has nearest neighbors of class 1, 1, 3 (rank ordered). If, for handwriting analysis, it is allowed that the probability that the test point is a 1 is different than if the nearest neighbors were 1, 1, 7, since 7's are more often confused with 1s than 3s are, then the proposed model is able to parameterize this information. Therefore, $C^2N$ parameters $w_{r_j c \bar{c}_j}$ are introduced, which correspond to the N different lookup tables 640, each containing $C^2$ entries. The second subscript c in w indexes the hypothesized target class; the third subscript $\bar{c}_j$ is the class of the jth nearest neighbor. Since the number of parameters can become unwieldy for a large number of classes, a regularization scheme is required to enforce sparcity. Two illustrative examples of such a scheme are to add the L1 norm of the weights to the loss function F, so that $g = \lambda \Sigma_{j,c} |w_{jc\bar{c}_j}|$, and a batch version, where after training epoch, a fraction (e.g., 90%) of the weights with the smallest values are set to zero. A justification for the latter is that it is closer to estimating the gradient in batch mode and provides better accuracy on a validation set. Thus, for this model:

$$z(x, c) = \sum_{j \in I_N(x)} w_{r_j c \bar{c}_j} K(x, x_j)(2\delta_{c\bar{c}_j} - 1) + b_c \qquad (11)$$

The update rules for the fourth model are, for the ith pattern:

$\Delta w_{r_j c \bar{c}_j} = \epsilon \delta_j(x_i) K(x_i, x_j)(2\delta_{c\bar{c}_j} - 1)(1 - P(\bar{c}_i | x_i))$ for $c = \bar{c}_i$ and
$\Delta w_{r_j c \bar{c}_j} = -\epsilon \delta_j(x_i) K(x_i, x_j)(2\delta_{c\bar{c}_j} - 1)(1 - P(c | x_i))$ for $c \neq \bar{c}_i$. The update rule for the priors $b_c$ is as before. The learning rate for the $b_c$ is chose to be 1/C times that for the $w_{jcc_j}$, for the same reasons described for the previous three models.

It is appreciated that other implementations and/or suitable trained parametric models in addition to or instead of the four described above can be employed for the trained probability transducer 206 and still be in accordance with the present invention. Further, it also appreciated that some parametric models do not require ranking and thus, the distance computation component 202 can be configured so as to not provide ranking information in order to increase computational efficiency.

Figure 10:
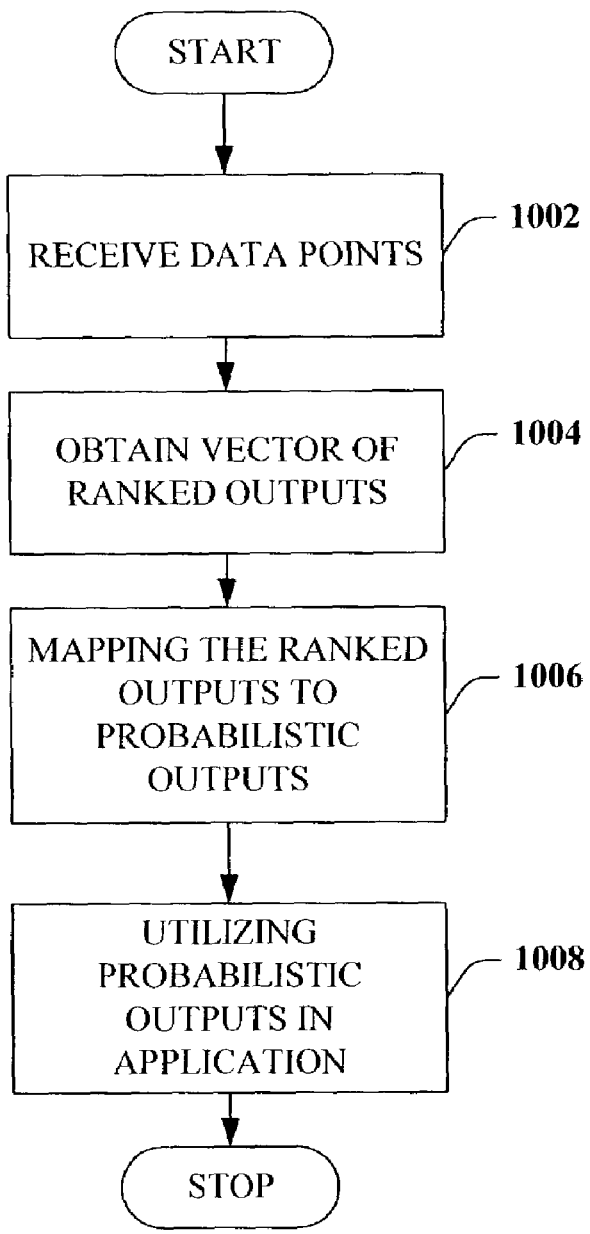
FIG. 10 is a flow diagram illustrating a method of generating posterior probabilities in accordance with an aspect of the present invention.
Figure 11:
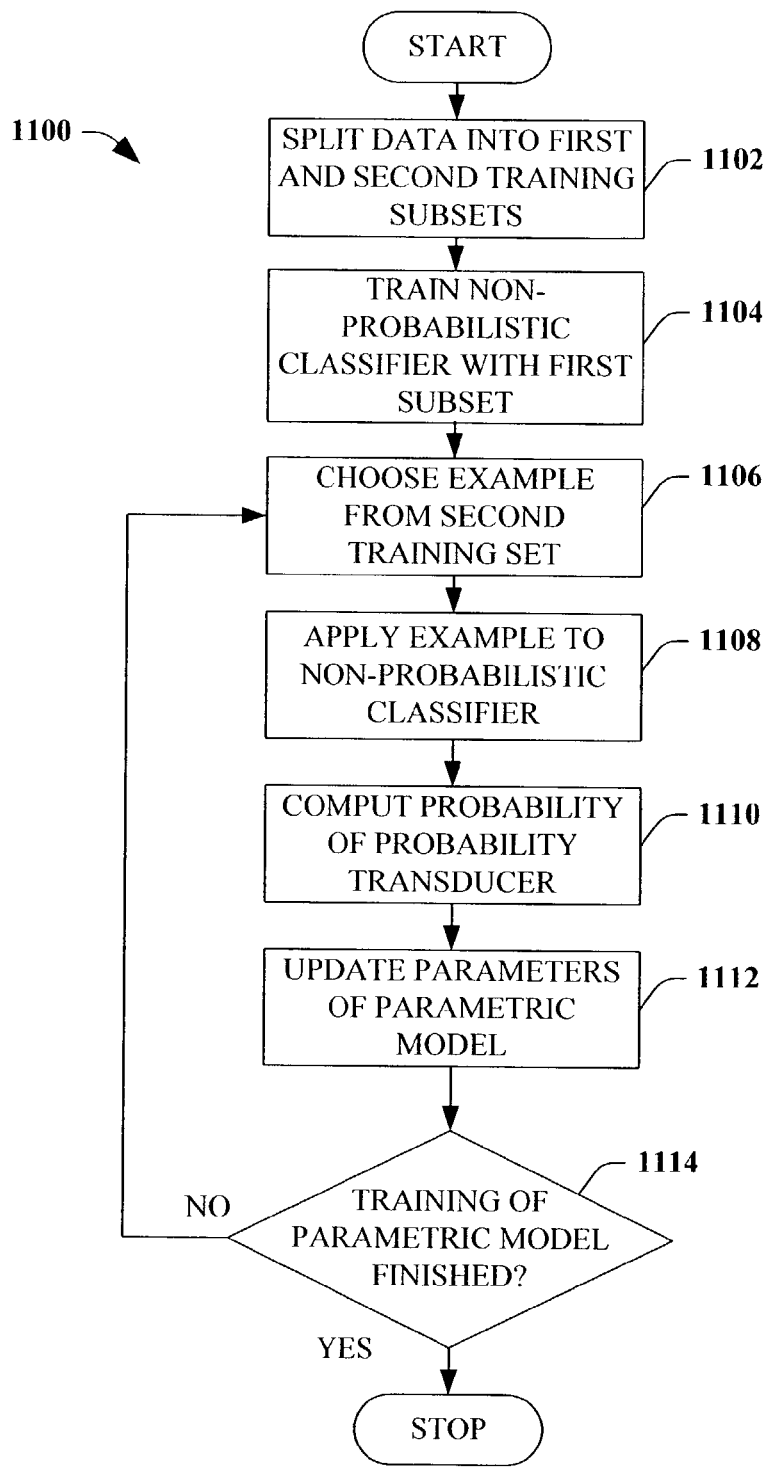
FIG. 11 is a flow diagram illustrating a method of training a probability transducer in accordance with an aspect of the present invention.

In view of the foregoing structural and functional features described above, methodologies in accordance with various aspects of the present invention will be better appreciated with reference to FIGS. 10–11. While, for purposes of simplicity of explanation, the methodologies of FIGS. 10–11 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 10 illustrates a flow diagram of a method 1000 that facilitates generation of posterior probabilities in accordance with an aspect of the present invention. The method 1000 employs a trained classifier and a trained probability transducer (e.g., a mapping component) to generate probabilistic outputs (e.g., posterior probabilities) which can then be employed for a pattern recognition application such as handwriting analysis.

The method begins at 1002, where data point(s) are received. The data point(s) comprise information such as, but not limited to, image data, measurements, audio data, database information and the like. The data point(s) are then processed individually to obtain a vector of ranked outputs at 1004, also referred to as classifier outputs. A given output respectively comprises a class label, an index identifying a particular element in the database used to train the classifier, a distance measure, and a ranking for K nearest neighbors. Generally, a KNN classifier is employed to generate the ranked outputs. The vector of ranked outputs does not include probabilistic information.

Subsequent to obtaining a vector of ranked outputs for respective data point(s), mapping or converting the outputs into probabilistic outputs (e.g., posterior probabilities) at 1006 via a suitable mapping mechanism (e.g., a trained parametric model). A suitable mechanism can be one of the models described with respect to FIG. 2. Then, the posterior probabilities are employed to perform an application such as handwriting analysis at 1008.

It is appreciated that sufficient training should be performed prior to utilizing the method 1000 for a pattern recognition application.

FIG. 11 is a flow diagram of a method 1100 of training a probability transducer in accordance with an aspect of the present invention. The probability transducer can be utilized in a system such as system 200 of FIG. 2. Generally, the method involves training a non-probabilistic classifier and subsequently utilizing the trained non-probabilistic classifier to train the probability transducer.

The method 1100 begins at block 1102, where a data set is split or segmented into a first training subset and a second training subset. The second training subset and the first training subset are disjoint. The data set comprises examples, and each example comprises an input data point and a class label. The split between the first and the second training subsets can be performed via a stochastic process. For example, 70% of the data set can be assigned at random to the first training subset, while the remaining 30% can be assigned to the second training set. At block 1104, the non-probabilistic classifier is trained using the first training set via a suitable training algorithm for non-probabilistic classifiers. For example, the training of a KNN classifier can be accomplished by loading the training set into a database of stored examples. Alternatively, other known methods, such as "reduced nearest neighbor", can be employed wherein a subset of the training set can be selected for storage.

Continuing with block 1106, an example from the second training set is selected. Such selection can be accomplished by drawing an example at random, or by sequentially sweeping through a random permutation of the second training set. Alternatively, more sophisticated algorithms such a leave-one-out can be used in conjunction with block 1106. Block 1108 then applies the example selected at block 1106 to the non-probabilistic classifier. The output of the non-probabilistic classifier is then processed by the probability transducer to yield an output at block 1110. Depending on the implementation, block 1110 will execute the approaches described with respect to FIG. 4, FIG. 6, FIG. 8, and/or a similar method. Block 1112 then updates the parameters of the parametric model by comparing the output at block 1110 with the true class label of the example chosen at block 1106. Block 1112 uses an update rule, such as described with respect to FIG. 5, FIG. 7, FIG. 9 and/or suitable variations thereof, that is appropriate for the chosen implementation of the probability transducer. Alternatively, block 1112 can use a similar process to the update rule to compute the gradient of an error metric with respect to the parameters, and then periodically update the parameters based on the gradient or other information (e.g., such as the Hessian of the error metric).

Block 1114 then determines whether the training of the probability transducer is complete. The training may be complete when a pre-determined number of examples have been applied to the probability transducer 206, or when the rate of decrease of the error metric has reduced below a pre-determined threshold.

According to an alternate aspect of method 1100, the original data set at block 1102 is split into three subsets: a first training set, a second training set, and a validation set. After a pre-determined number of applications of examples to the probability transducer, all of the examples in the validation set may be applied to the system and the error metric can be used to measure the error on the validation set. If the error on the validation set has reached a minimum, the training may be stopped and the parameters of the parametric model that yielded the minimum error can be saved and used to evaluate new test points.

If the method 1100 determines that training is not finished at block 1114, then control flows back to block 1106, where another example is selected from the second training subset. Otherwise, training of the parametric model is complete and the probability transducer can be utilized (e.g., in a pattern recognition system) and/or a method that facilitates generating posterior probabilities (e.g., method 1000 of FIG. 10).

Figure 12:
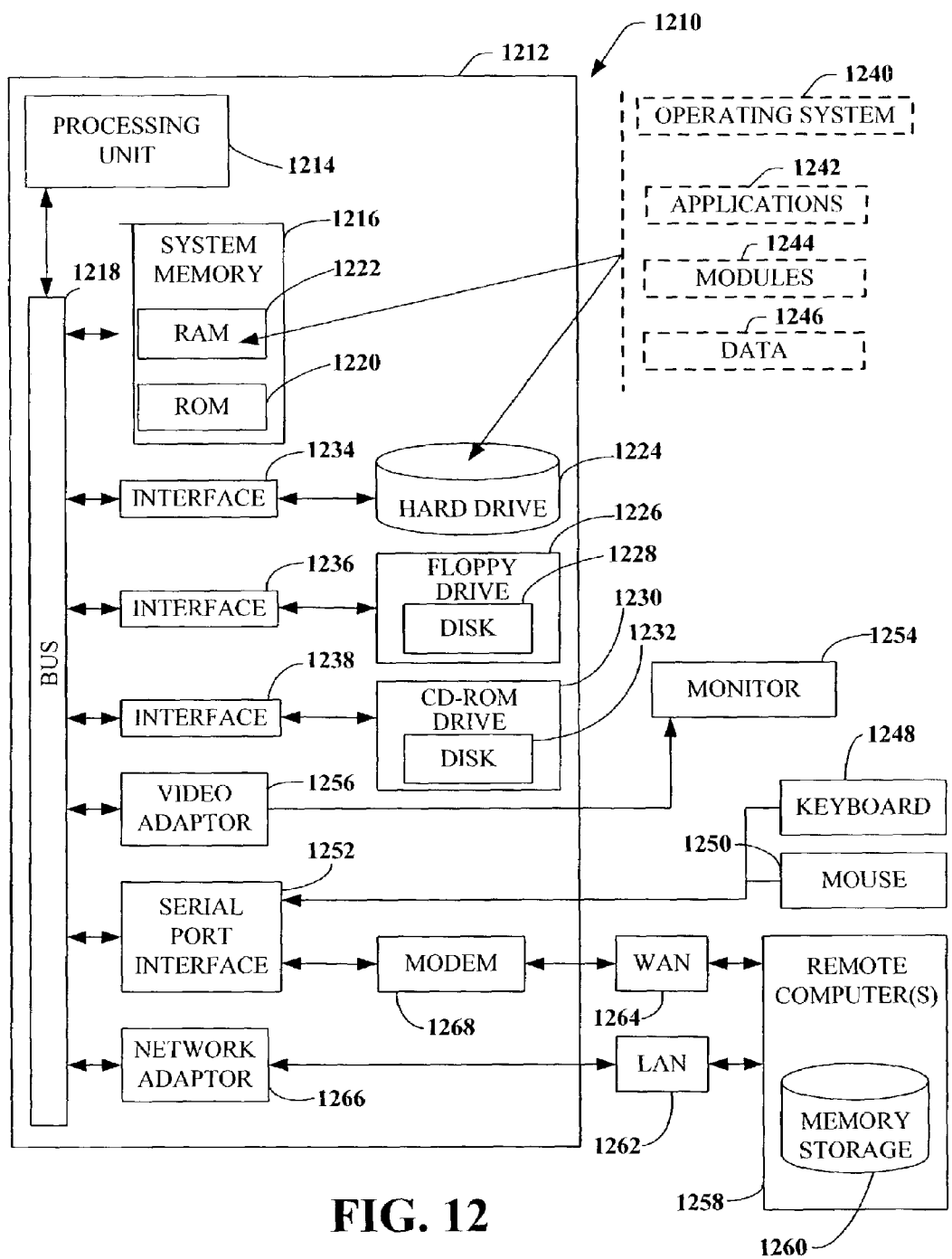
FIG. 12 is a schematic block diagram of an exemplary operating environment for a system configured in accordance with the present invention.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1210 for implementing various aspects of the invention includes a computer 1212, including a processing unit 1214, a system memory 1216, and a system bus 1218 that couples various system components including the system, memory to the processing unit 1214. The processing unit 1214 may be any of various commercially available processors. Dual microprocessors and other multi-processor architectures also can be used as the processing unit 1214.

The system bus 1218 may be any of several types of bus structure including a memory bus or memory controller, a peripheral bus, and a local bus using any of a variety of commercially available bus architectures. The computer memory 1216 includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 may further include a hard disk drive 1224, a magnetic disk drive 1226, e.g., to read from or write to a removable disk 1228, and an optical disk drive 1230, e.g., for reading a CD-ROM disk 1232 or to read from or write to other optical media. The hard disk drive 1224, magnetic disk drive 1226, and optical disk drive 1230 are connected to the system bus 1218 by a hard disk drive interface 1234, a magnetic disk drive interface 1236, and an optical drive interface 1238, respectively. The computer 1212 typically includes at least some form of computer readable media. Computer readable media can be any available media that can be accessed by the computer 1212. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1212. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1222, including an operating system 1240, one or more application programs 1242, other program modules 1244, and program non-interrupt data 1246. The operating system 1240 in the computer 1212 can be any of a number of commercially available operating systems.

A user may enter commands and information into the computer 1212 through a keyboard 1248 and a pointing device, such as a mouse 1250. Other input devices (not shown) may include a microphone, an IR remote control, a joystick, a game pad, a satellite dish, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254, or other type of display device, is also connected to the system bus 1218 via an interface, such as a video adapter 1256. In addition to the monitor, a computer typically includes other peripheral output devices (not shown), such as speakers, printers etc.

The computer 1212 may operate in a networked environment using logical and/or physical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

Figure 13:
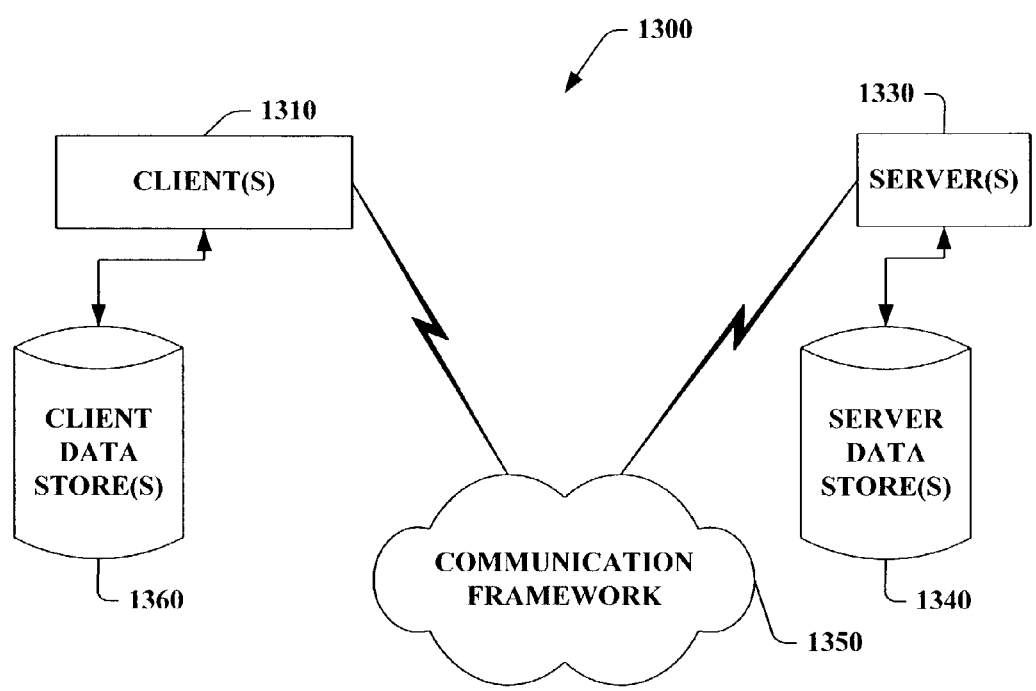
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (OR-DBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented pattern recognition system comprising:

a classifier that receives pattern-related indicia and classifies the indicia by determining distances of K nearest neighbors; and a trained probability transducer that calculates posterior probabilities of classes based on the distances of the K nearest neighbor outputs of the classifier.

2. The system of claim 1, the pattern related indicia comprising scanned images of handwriting.

3. The system of claim 1, the pattern related indicia comprising medical images.

4. The system of claim 1, the pattern related indicia comprising audio data.

5. The system of claim 1, the outputs being ranked.

6. The system of claim 1, the outputs comprising a class and distance.

7. The system of claim 6, the classifier comprising a kernel function that computes the distance.

8. The system of claim 1, the outputs comprising an index into a stored database of examples, a class, and a distance.

9. The system of claim 8, the classifier comprising a kernel function that computes the distance.

10. The system of claim 1, the trained probability transducer comprising a softmax component.

11. The system of claim 10, the trained probability transducer further comprising a trained parametric model.

12. The system of claim 11, the trained parametric model comprising a plurality of rank-class computations.

13. The system of claim 12, the rank-class computations comprising a comparison between a class output produced by the classifier and a second class.

14. The system of claim 12, the rank-class computations comprising a lookup table, wherein the index into the lookup table depends on a class output produced by the classifier and a second class.

15. The system of claim 12, the rank-class computations comprising a lookup table, wherein the index into the lookup table depends on an index output produced by the classifier.

16. The system of claim 11, the trained parametric model comprising learned partial stun initializations.

17. The system of claim 11, the trained parametric model comprising one parameter per rank.

18. The system of claim 11, the trained parametric model comprising one lookup table per rank.

19. The system of claim 11, the trained parametric model comprising a lookup table, the lookup table containing one entry for each example in a training set.

20. A computer-implemented method that generates posterior probabilities comprising:

computing a non-probabilistic classifier output for a data point, the non-probabilistic classifier output comprising a ranked vector of K nearest neighbor outputs; and computing probabilistic outputs for the data point from the ranked vector of K nearest neighbor outputs utilizing a trained parametric model.

21. The method of claim 20, the probabilistic outputs comprising a probability and class for the given data point.

22. A computer-implemented classification system comprising:

means for computing a non-probabilistic classifier output for at least one data point, the non-probabilistic classifier output comprising a ranked vector of K nearest neighbor outputs; and means for computing probabilistic outputs for the at least one data point from the ranked vector of K nearest neighbor outputs utilizing a trained parametric model.

* * * * *